United States Patent [19]
Cummings, III

[11] Patent Number: 5,947,247
[45] Date of Patent: *Sep. 7, 1999

[54] CONTINUOUSLY VARIABLE FAN DRIVE CLUTCH

[75] Inventor: Gordon F. Cummings, III, Rockford, Ill.

[73] Assignee: Rockford Powertrain, Inc., Rockford, Ill.

[*] Notice: This patent is subject to a terminal disclaimer.

[21] Appl. No.: 08/837,537

[22] Filed: Apr. 21, 1997

Related U.S. Application Data

[63] Continuation-in-part of application No. 08/532,226, Sep. 19, 1995, Pat. No. 5,667,045, which is a continuation-in-part of application No. 08/529,357, Sep. 18, 1995, abandoned.

[51] Int. Cl.$^6$ .................... F16D 25/0638; F16D 25/08
[52] U.S. Cl. ........................ 192/70.12; 192/85 CA; 192/112
[58] Field of Search .................... 192/18 A, 1.2 C, 192/58.42, 70.12, 85 CA, 82 T, 103 F, 113.34, 112; 123/41.12; 416/169 A

[56] References Cited

U.S. PATENT DOCUMENTS

| | | |
|---|---|---|
| 3,207,279 | 9/1965 | Ahlen . |
| 3,324,981 | 6/1967 | Aschauer . |
| 3,587,537 | 6/1971 | Spokas . |
| 3,592,022 | 7/1971 | Stokely . |
| 3,804,219 | 4/1974 | Cummings, III . |
| 3,805,931 | 4/1974 | Portmann . |
| 3,848,622 | 11/1974 | Cummings, III . |
| 3,915,269 | 10/1975 | Houser . |
| 3,927,830 | 12/1975 | Briski . |
| 3,985,214 | 10/1976 | Hall et al. . |
| 4,066,157 | 1/1978 | Gibbs . |
| 4,074,663 | 2/1978 | Cory . |
| 4,081,064 | 3/1978 | Smith et al. . |
| 4,086,995 | 5/1978 | Spokas . |
| 4,094,393 | 6/1978 | Spokas . |
| 4,123,905 | 11/1978 | Posega, Jr. . |
| 4,131,187 | 12/1978 | Smith et al. . |
| 4,142,619 | 3/1979 | Spokas . |

(List continued on next page.)

OTHER PUBLICATIONS

Froslie, L.E. et al. *Design Practices–Passenger Car Automatic Transmissions* (Warrendale, PA, Society of Automotive Engineers, 1973), pp. 116–124. TL260.S6 1973.

Fan Drives for Electronic Diesel Engines, *Diesel Progress Engines & Drives*, pp. 10 and 12 (undated).

*Primary Examiner*—Richard M. Lorence
*Attorney, Agent, or Firm*—Leydig, Voit & Mayer, Ltd.

[57] ABSTRACT

A clutch mechanism is provided for a cooling fan of a size capable of fitting into the limited envelope available in an over-the-road diesel tractor. A compact housing has a belt drive input and an output connected to the fan hub. The housing includes a pressure chamber in fluid communication with a pressurized air supply and a controllable valve in the air supply line for regulating the pressure in the pressure chamber when the clutch must be operated. The air pressure actuates an internal piston to translate the clutch in a continuously variable manner between engaged and disengaged conditions.

A small envelope clutch, having an outer diameter less than about 9.8 inches in diameter within the fan hub and less than about 6 inches under the belts and 7.3 inches overall so the housing may be positioned between the radiator and the engine, is capable of generating 150 foot-pounds of torque, running a 55 horsepower fan at 2100 rpm, and dissipating 10 horsepower of heat while in the slip mode. The clutch also has at least 130 inches in clutch area.

Fan speed is controlled utilizing a closed loop control system. The control system is capable of monitoring engine conditions and controlling fluid pressure actuating the clutch assembly to control the fan speed in response to the engine conditions.

32 Claims, 5 Drawing Sheets

U.S. PATENT DOCUMENTS

| | | |
|---|---|---|
| 4,214,652 | 7/1980 | Quenneville . |
| 4,231,457 | 11/1980 | Cornish . |
| 4,238,017 | 12/1980 | Spokas . |
| 4,337,628 | 7/1982 | Greene . |
| 4,348,990 | 9/1982 | Nolte et al. . |
| 4,352,276 | 10/1982 | Smith . |
| 4,425,879 | 1/1984 | Shadday et al. . |
| 4,456,110 | 6/1984 | Hanks et al. . |
| 4,474,082 | 10/1984 | Spokas et al. . |
| 4,483,430 | 11/1984 | Carmichael et al. . |
| 4,489,680 | 12/1984 | Spokas et al. . |
| 4,535,879 | 8/1985 | Sturges . |
| 4,546,742 | 10/1985 | Sturges . |
| 4,555,910 | 12/1985 | Sturges . |
| 4,589,535 | 5/1986 | Hall et al. . |
| 4,637,504 | 1/1987 | Rule et al. . |
| 4,674,609 | 6/1987 | Sturges et al. . |
| 4,694,946 | 9/1987 | Pearch et al. . |
| 4,775,041 | 10/1988 | Boffelli . |
| 4,810,233 | 3/1989 | Crane, Jr. et al. . |
| 4,828,088 | 5/1989 | Mohan et al. . |
| 4,899,861 | 2/1990 | Cummings, III . |
| 5,078,533 | 1/1992 | Madonio et al. . |
| 5,178,584 | 1/1993 | Cummings, III et al. . |
| 5,222,574 | 6/1993 | Miller . |
| 5,445,257 | 8/1995 | Grabis . |
| 5,487,457 | 1/1996 | Isanhart . |
| 5,667,045 | 9/1997 | Cummings, III ............... 192/18 A | ably responding to engine
CONTINUOUSLY VARIABLE FAN DRIVE CLUTCH

RELATED APPLICATIONS

This application is a continuation-in-part of application Ser. No. 08/532,226, filed Sep. 19, 1995, for Continuously Variable Fan Drive Clutch Arrangement now U.S. Pat. No. 5,667,045, which is incorporated by reference into this application which is a continuation-in-part of application Ser. No. 08/529,357, filed Sep. 18, 1995, now abandoned.

FIELD OF THE INVENTION

This invention relates to cooling fan clutch mechanisms particularly suited for large, over-the-road vehicles, and more particularly, to an improved pneumatic fan clutch which is small in size yet provides reliable continuously variable speed control.

BACKGROUND OF THE INVENTION

Cooling requirements for internal combustion engines are subject to wide variations depending upon operating conditions. When the engine is relatively cold, little or no cooling is required. Indeed, in very cold operating conditions, cooling may be undesirable. During engine operation, the necessary cooling varies as a function of engine load, and with external conditions such as air temperature and wind or vehicle velocity.

The conventional internal combustion engine is provided with an engine driven fan. The fan can absorb a considerable proportion of the total output power of the engine. For example, in large diesel over-the-road tractors, the fan might require as much as 55 horsepower. With that in mind, and considering the requirements for fuel efficiency, fan drives have been developed which operate only when cooling is needed. Thus, when the engine is operating in normal load and at cruising speeds, there may be adequate air flow through the radiator without the fan, to allow the fan to be declutched from the engine. Conversely, in stop-and-go traffic, under heavy loads, or when parked and idling, the clutch may be engaged to couple the fan to the engine to provide cooling air flow.

If space were not a problem, it would be relatively straightforward to provide a continuously variable relatively reliable clutch mechanism to couple the fan and engine. However, when one appreciates the desires of the truck and engine designers to minimize the space requirements "under-the-hood" and the critical need to efficiently use the under-the-hood space, it will be quickly appreciated that a relatively small envelope is available for the clutch mechanism. The envelope is limited axially by the distance between the radiator and the engine, and it is limited radially, as a practical matter, by the size of sheave which can be accommodated for the pulley driving the fan.

Conventional clutch mechanisms have had their disadvantages. Approaches utilizing dry clutches have typically resulted in on/off operation since the dry clutch could not slip for long without overheating. Inherent in on/off applications is the typical shock load to the drive unit when the drive clutch is engaged. The shock load is not only undesirable from the viewpoint of loading and wear on the mechanism, but is also aesthetically detrimental. When the vehicle is parked, for example, but the engine is running in order to maintain heat or cooling, the fan clutch will typically cycle on and off, creating significant audible disturbance. A further disadvantage of on/off operation is that the system is effectively a coolant temp loop control system. This introduces a response time delay and the clutch mechanism is incapable of dynamically responding to engine conditions to insure that the fan operates at precisely the desired speed and/or to selectively determine fan speed.

One attempt to avoid the problems with dry clutch fan drives has been the attempted use of viscous coupling between the input and output members of the drive unit. Unfortunately, these approaches have also had their drawbacks. First, viscous couplings have poor release capability and no "lock-up" capability so that the drive input and output members may not be driven at the same speed. Moreover, fan drives using viscous couplings have limited horsepower capability, and cannot quickly dissipate heat from the engine. Most viscous coupling designs are slow to engage after sensing heat, and cannot be completely declutched when cooling is not desired.

Wet clutch mechanisms for driving engine fans have also been used. Wet clutch mechanisms, which typically use oil in the engine sump, have been used to provide relatively continuously variable speed, and will not overheat under most conditions by virtue of the oil-bathed clutch mechanism. In engines having relatively wide operating rpm ranges, and therefore wide operating oil pressure ranges, the clutch mechanism must have a relatively large hydraulic piston operating area to reliably operate the clutch at the oil pressure extremes, that is, from relatively low oil pressures at idle to relatively high oil pressures at high engine speeds. Similarly, they have required relatively bulky mechanisms to pump or pressurize the oil in the clutch housing As a result, wet clutches with adequate horsepower for fan drive operation have been relatively large.

In some applications, such as off-the-road vehicles including tractors, loaders, graders and the like, there is adequate room in the engine compartment to tolerate the relatively large clutch mechanisms typically associated with wet clutches. However, in other applications where space requirements are more critical, including, for example, over-the-road tractors, the requirements for aerodynamics, appearance, vehicle size, vehicle weight and the like have all combined to reduce the size of the engine compartment. Thus, the relatively large wet clutches having adequate horsepower for fan operation are less compact than desired and may pose a problem for such applications.

SUMMARY AND OBJECTS OF THE INVENTION

It is a general aim of the present invention to provide a continuously variable speed control for an engine fan in a package compatible with over-the-road vehicle requirements.

In accomplishing that aim, it is an object to utilize a wet clutch mechanism coupled with a control particularly adapted to the wide range of operating conditions typically associated with an over-the-road vehicle.

Even more particularly, an object of the present invention is to provide a fan drive clutch mechanism which does not require oil pressure to operate the clutch mechanism.

It is a specific goal of the present invention to provide a novel fan clutch mechanism which may be operated by the vehicle's air supply.

A further object of the invention is to provide a clutch mechanism which is adapted to fit within the space limitation of conventional over-the-road vehicle engines.

Yet another object of the invention is to utilize closed loop control circuitry to enable the system to dynamically respond to external engine conditions to selectively determine fan speed to optimize engine efficiency.

More specifically, it is an object to provide a system capable of controlling the fan speed to eliminate or reduce noise levels and shock loads on the fan drive and engine typically produced in on/off fan clutches.

It is also an object to provide a control system capable of fan speed clipping at high engine speeds to preserve engine efficiency and noise reduction.

Similarly, it is an object of the present invention to provide a system which precisely controls coolant temperatures in the engine.

These and other features and advantages of the invention will be more readily apparent upon reading the following description of a preferred exemplified embodiment of the invention and upon reference to the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
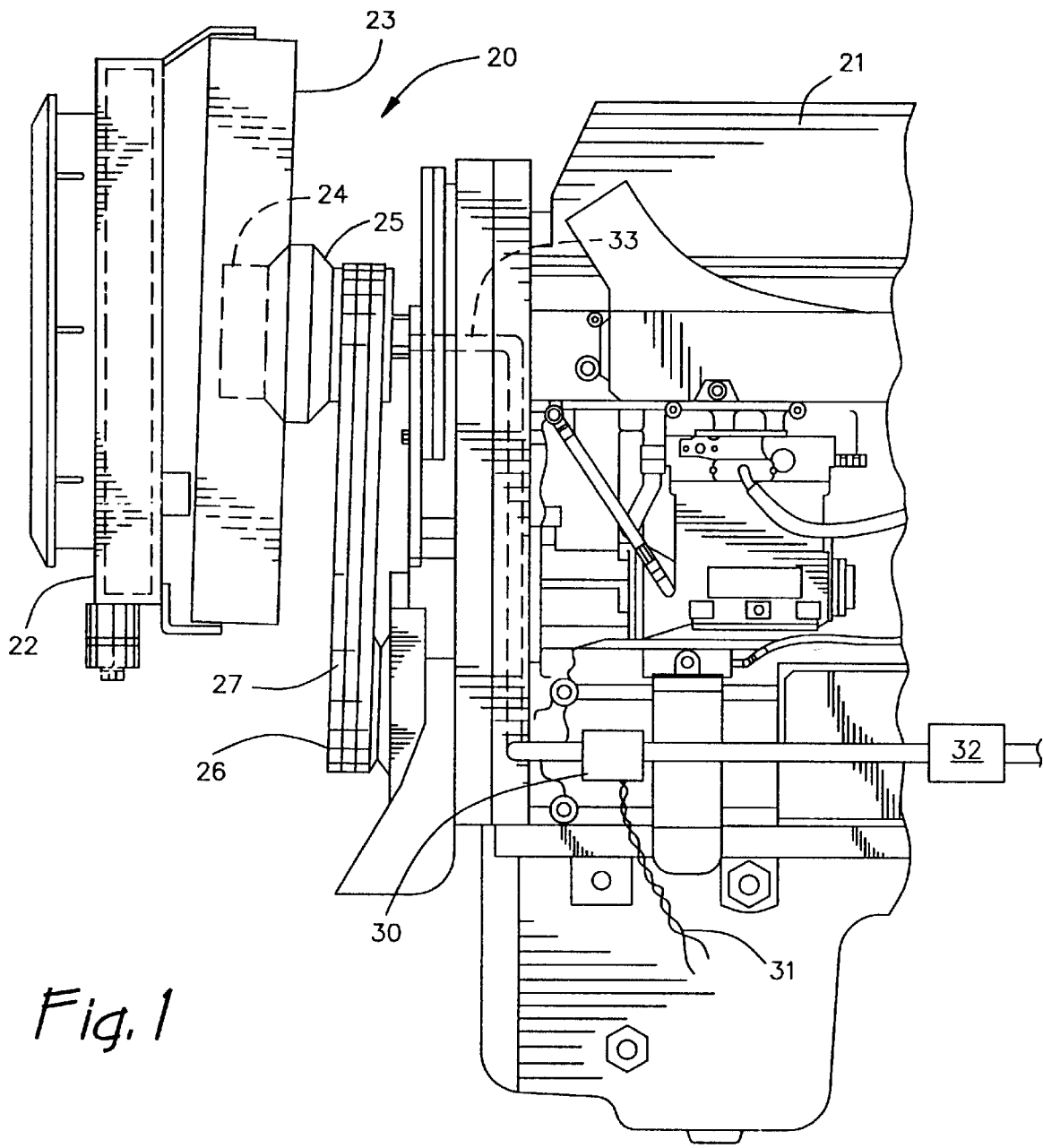
FIG. 1 is a partial elevation showing the front end of an engine and an associated cooling fan and pneumatic clutch mechanism in accordance with the present invention.

Turning to the drawings, and particularly FIG. 1, a fan clutch 20 is shown in association with an engine 21 typically used in over-the-road applications and a conventional radiator 22 capable of supplying cooling for over-the-road engines. A fan 23 is shown connected to a fan hub 24 which in turn is driven by a fan clutch mechanism 25. The fan clutch mechanism 25 is driven by a crankshaft output or accessory drive pulley 26 connected to the sheave of the fan drive 25 by a set of drive belts 27. The clutch mechanism 25 couples power transmitted by the drive belts 27 from the engine to the fan 23.

In accordance with the invention, the fan clutch mechanism 20 has a continuously variable output speed, controlled by an electrical signal responsive to cooling needs, so that the fan 23 rotates at a speed needed by the engine for adequate cooling. In some cases, the fan 23 may be de-clutched so that the load by the drive belts 27 on the engine is minimized or eliminated. In other cases, the fan 23 may be operated in an overspeed condition to provide additional cooling.

Figure 2:
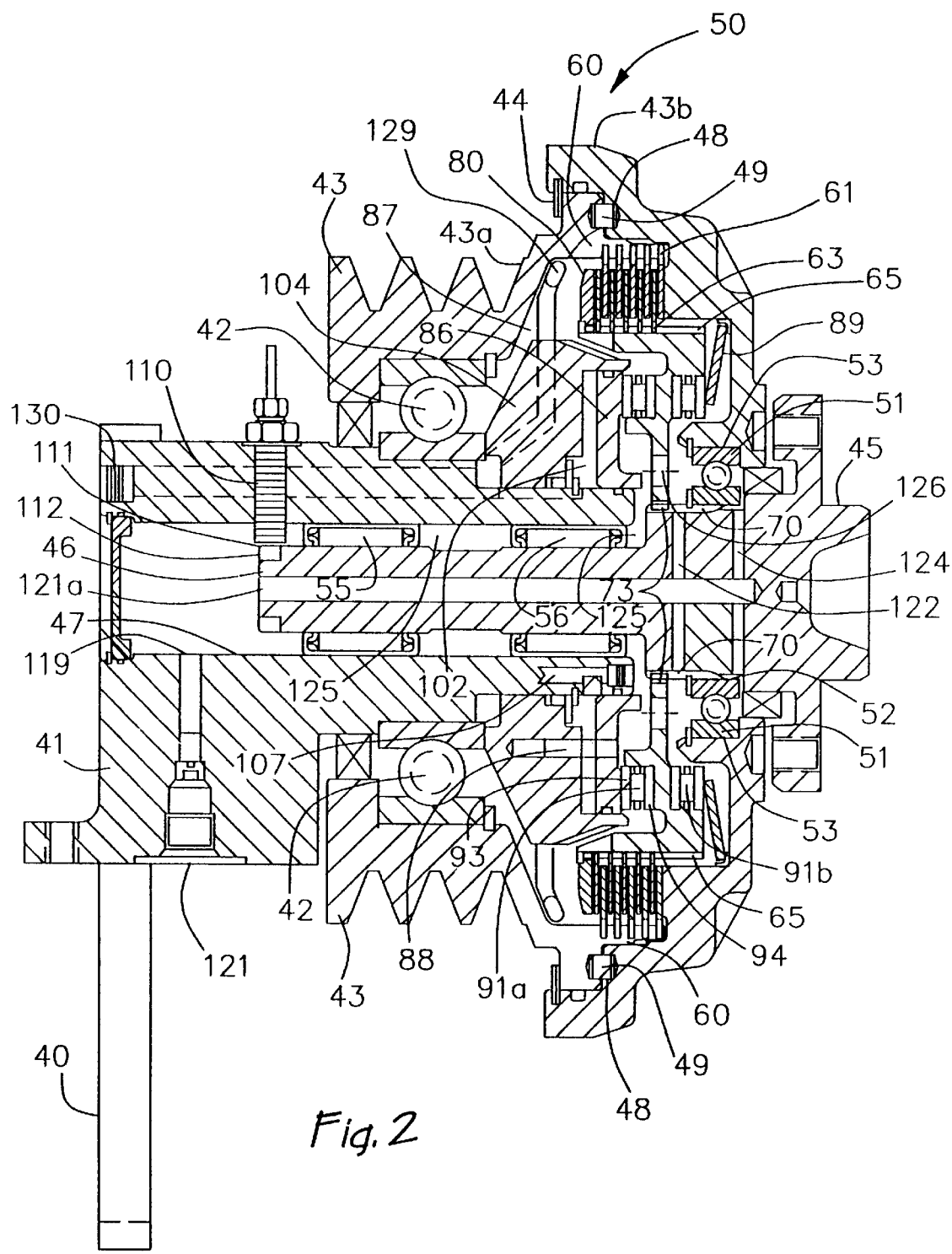
FIG. 2 is a cross-sectional view of the fan clutch of FIG. 1.
Figure 4:
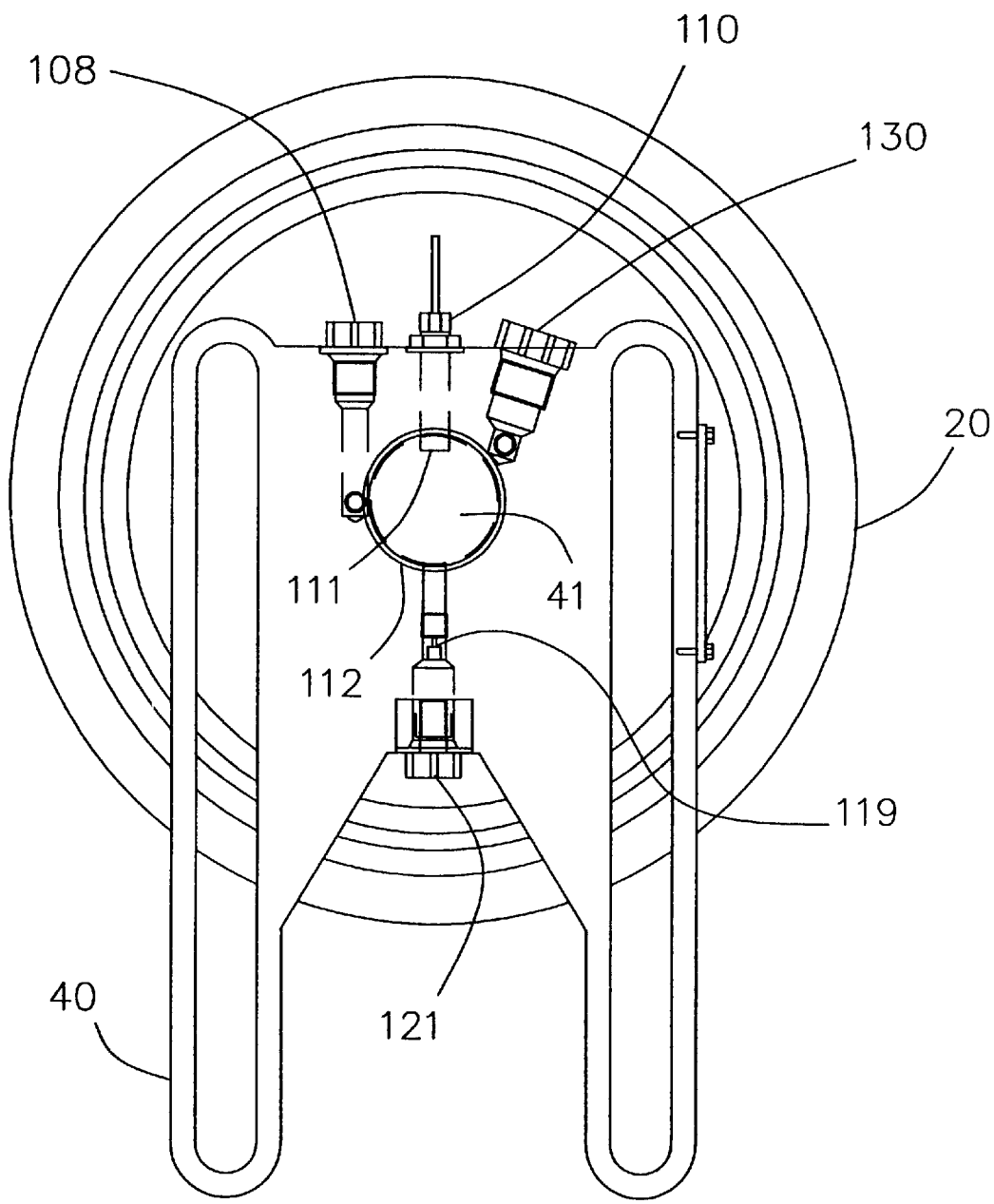
FIG. 4 is an end view of the fan clutch of FIG. 2.

As best shown in FIGS. 2 and 4, the fan clutch 20 includes a mounting bracket 40 which is securely fixed to the engine 21. The mounting bracket 40 has an axial mounting shaft 41 which carries the rotating elements of the fan clutch 20. The cylindrical and hollow shaft 41 externally supports a main bearing 42 which mounts an engine-driven main drive housing 43 configured to fit the belt drive 27. The belt drive 27 is located just above the bearing 42 so that the load on the bearing 42 is generally radial with respect to the mounting shaft 41. A fan drive hub 45 has an extended shaft 46 which fits within a cylindrical aperture 47 of the mounting shaft 41. A clutch mechanism generally referenced at 50 variably connects the main drive housing 43 to the fan drive hub 45. When the clutch is fully engaged, the fan drive hub 45 rotates at the same speed as the main input or drive housing 43. As the clutch is gradually disengaged, the fan drive hub 45 slows down relative to the input drive housing 43, until the clutch is fully released or declutched, wherein a brake holds the fan drive hub 45 stationary while the input housing 43 continues to rotate in response to the belt drive 27.

Figure 3:
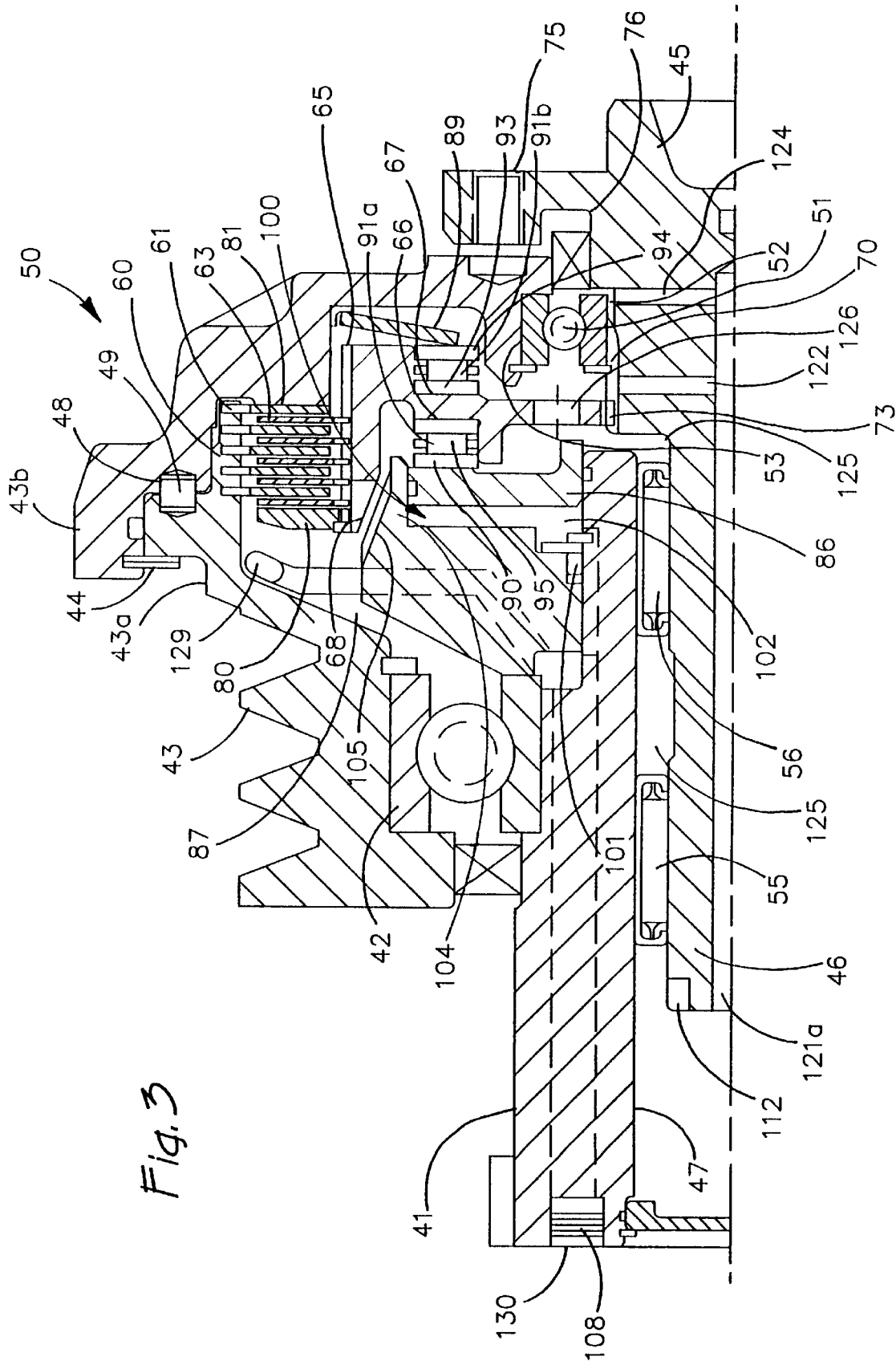
FIG. 3 is an enlarged cross-sectional view of the fan clutch of FIG. 2.

For axially constraining the fan drive hub 45 relative to the input housing 43, another bearing 51 is interposed between surface 52 on the drive hub 45 and surface 53 on the main drive housing 43 (FIG. 3). Bearings 55, 56 engage a shaft portion 46 of the drive hub 45 for rotatably supporting the hub 45 within the mounting shaft 41. Oil seals and retainer rings and the like are shown in the drawings, but will not be described in great detail since one of ordinary skill in the art will recognize the structure and functionality of such elements from their appearance in the figures.

Referring to the clutch mechanism 50 in FIG. 3, it will be seen that the outer diameter of the drive housing 43 has an annular flange 60 which carries a plurality of driving clutch plates 61. The driving clutch plates 61 are axially slidable in splines on the flange 60 so that they are rotated with the drive housing 43. A plurality of driven clutch plates 63 are interposed in the driving clutch plates 61. The illustrated embodiment has five driving clutch plates 61 and driven clutch plates 63. It will be appreciated that, in accordance with certain objects of the invention to minimize the size of the clutch package, disposing the clutch plates 61, 63 adjacent the outer diameter of the drive housing 43 maximizes the clutch plate area for a given housing diameter. In a small envelope clutch having less than a 9.8 inch diameter within the fan hub, the clutch plates should have at least 130 square inches of clutch plate area. The driven clutch plates 63 are carried by an internal clutch hub 65 and are axially slidable on splines on the hub 65 so that the driven clutch plates 63 may slide axially relative to each other to either engage or release the driving clutch plates 61. The clutch hub 65 also has an internal spline 73 which matingly engages an external spline 70 on the drive hub 45 to form a splined connection 70, 73 for driving the fan hub 45 in response to the drive housing 43. The clutch hub spline 73 may slide axially along the drive hub spline 70 when the clutch plates 61, 63 are substantially disengaged and the spring 89 is able to overcome the load which may be exerted on the spline connection 70, 73.

Referring to FIGS. 2-3, it will be seen that the clutch plates 61, 63 are disposed between a pressure plate 80 and an operating face 81 of the drive housing 43. The operating face 81 of the drive housing 43 cooperates with the pressure plate to press the clutch plates together, thereby eliminating the need for an opposing pressure plate and, in accordance with certain objects of the invention, minimizing the package size of the clutch mechanism 20. The pressure plate 80, disposed to the left of the interposed clutch plates 61, 63, is carried by the internal clutch hub 65 for actuating the clutch 50.

The drive housing 43 comprises a piston housing generally referenced as 87. The piston housing 87 has a clutch piston 86 and a cone brake 104. The clutch piston 86 is mounted over the stationary mounting shaft 41 so as to be axially movable to actuate the pressure plate 80 and, ultimately, to operate the clutch 50. Interposed between the operating face 90 of the clutch piston 86 and left face 66 of the internal clutch hub 65 is a thrust-bearing assembly 91$a$. A thrust bearing assembly 91$b$ is also interposed between the right face 67 of the clutch hub 65 and spring 89. The assemblies 91$a$ and 91$b$ include a pair of thrust washers 93, 94, one adjacent to the operating face 90 of the clutch piston 86 or the spring 89 and one in contact to the respective faces 66, 67 of the internal clutch hub 65. Interposed between the thrust washers 93, 94 is a needle-bearing assembly 95 for allowing relative rotation between the two thrust washers 93, 94. A lug or pin 88 may be disposed in the cone brake 104 and the piston 86 to prevent the piston from rotating in response to any rotation of the thrust washers 93, 94. Thus, axial forces generated by the clutch piston 86 are transmitted through the thrust-bearing assembly 91$a$ to the internal clutch hub 65 and to the pressure plate 80 to control the amount of pressure on the clutch plates 61, 63. Similarly, axial forces generated by the spring 89 are transmitted to the internal clutch hub 65 to declutch the clutch mechanism and release the clutch plates 61, 63. It will be seen, upon reference to FIGS. 2-3, that the spring is laterally spaced from the clutch plates 61, 63 for minimizing the package size.

In accordance with certain objects of the invention, the clutch mechanism is provided with a pneumatic actuator assembly generally referenced as 100. Referring to FIGS. 2-3, the piston housing 87 has a pneumatic chamber 102 defined by a cone brake 104 and the clutch piston 86. The air pressure chamber 102 is sealed and separated from the oil and other contaminates by seals 101. The clutch is operated by controlling the air pressure in the pressure chamber 102. In order to supply air pressure to the air chamber 102, it will be seen that the air chamber is fed by an air passage generally denoted by 107 which is in communication with an air inlet port 108 and the air supply 32, respectively. When the pressure chamber 102 is fully pressurized, it will be appreciated that the pressure displaces the clutch piston 86 to right the as shown in FIG. 2. The clutch piston 86, acting through the thrust bearing 91$a$, 91$b$, overcomes the spring force to compress the spring 89 and translate the clutch hub 65 to the right. Increases in pressure permit the clutch plates 61, 63 to engage each other and rotate the fan hub 45. As the pressure in the pressure chamber 102 is decreased, the leftward action of the spring 89 begins to cause the clutch plates 61, 63 to slip, allowing the fan hub 45 to slow down relative to the drive housing 43. Release of the pressure in the chamber 102 allows the spring 89 to fully disengage the plates 61, 63 causing the fan hub 45 to be fully released from the drive hub 43.

It should now also be appreciated that the clutch hub 65 may be isolated between the two bearings 91$a$ and 91$b$ so that the hub 65 may slide axially along the spline 70 when the spring 89 overcomes the friction on the spline connection 70, 73 resulting from torque generated by minor clutch slippage or the inherent viscous drag in the viscous mode from the cooling oil which may drive the fan 23. When there is a torque on the spline connection, the spline connection is relatively stationary for normal operating pressure. The capacity of the clutch will be determined by compressive pressure on the clutch plates 61, 63 resulting from the pressure exerted on the stationary hub 65, not the movement of the clutch hub 65. Stated another way, the capacity of the clutch is to be positioned between a fully engaged position, wherein the fan drive housing and the fan drive hub rotate at the same speed, and a declutched position wherein the drive hub is stationary, is a function of the pressure exerted on the clutch hub 65.

In accordance with objects of the present invention, means are provided for sensing the actual speed of the fan drive hub 45 and controlling the fan speed. In the illustrated embodiment, a speed sensor 110, fixed in the mounting shaft 41, has a sensing face 111 which faces a toothed section 112 on the hub shaft 47. Thus, as the hub 45 rotates, the sensor 110 counts the passage of gear teeth 112, and electrical circuitry counts the number of teeth 112 passing per unit time to determine the rotational speed of the hub 45. Due to the precise control of hub speed which is achievable in accordance with the present invention, means can be provided for electrically setting a desired fan speed and assuring that the fan 23 is rotating at the desired speed by means of the speed sensing pickup. It will be appreciated that the present system permits the clutch plate pressure to be controlled by controlling the fan hub speed without having to directly measure the plate pressure.

Referring briefly to FIG. 1, it will be seen that a linear valve 30 is mounted on or near the engine 21 in the air supply line from a pressurized air supply 32 to the fan clutch 20. Electrical connections 31 to the valve 30 allow for the continuously variable adjustment of the valve 30 which in turn allows for the control of the pressure in the air pressure chamber 102 in the clutch housing. It should now be appreciated that the pressure in the pressure chamber 102 serves to operate the clutch piston 86, and thereby causes the partial or full release of the clutch 61, 63. The magnitude of the electrical control signal controls the valve 30, the pressure in the pressure chamber 102, the position of the piston 86 and therefore the state of the clutch mechanism, i.e., clutch position between the declutched and fully engaged positions. As the fan speed is measured by the speed sensor 110, the electrical control circuitry continues to alter the signal to the control valve 30 until the sensed speed matches the desired speed. Deviations in speed can be instantly detected by the speed sensor 110, and the signal adjusted to control the air supply valve 30 according to the desired setting.

In accordance with certain objects of the invention, means are provided for assuring that the fan 23 remains stationary under conditions when the electronics demand zero speed. In conventional wet clutches of the type illustrated, there will be inherent viscous drag from the cooling oil which may continuously drive the fan 23, even with the clutch 20 completely disengaged. This is undesirable in certain situations, such as very cold ambient conditions, where the engine 21 could experience overcooling from the flow of air over the engine 21.

The fan clutch 20 has a cone brake mechanism 104 for completely stopping the fan 21 after the clutch 50 is fully released. The brake mechanism 104 comprises a pair of cooperating brake surfaces 105, 68. The cone brake 104 is fixedly mounted to the stationary mounting shaft 41 and is, thus, non-rotational and fixed. The cone brake 104 has an inclined face 105 which may selectively engage a cooperating inclined face 68 on the inside face of the clutch hub 65 when the clutch is declutched and the clutch plates 61, 63 are disengaged. It will be appreciated that, in accordance with certain objects to minimize the clutch size, the inclined face multiplies the spring pressure and minimizes the need for high spring forces. When the spring 89 pushes the clutch hub 65 sufficiently to the left, the clutch will begin to slip more and more until ultimately the clutch plates 61, 63 are fully released. At that point, the drive hub 45 will be locked in position by virtue of the contact of the face 68 which is part of the drive hub 45 and the face 105 which is part of the non-rotational cone brake 104. Even in the presence of oil drag in the clutch assembly, the fan will remain in a completely stationary position. Thus, it will be appreciated that, in the normal unactuated condition, the clutch is maintained in the release condition by the spring 89, and requires pneumatic pressure to release the brake and engage the clutch.

In accordance with certain objects of the invention, the clutch mechanism has a unique feature permitting the operator to selectively overcome the unactuated condition in the event of an emergency. Referring to FIG. 3, the drive hub 45 and drive housing 43 have corresponding bolt holes 75, 76, respectively, which receive a bolt not shown. In normal operation, there is clearance between the drive hub 45 and drive housing 43 and the bolt is carried by the fan hub 65 as shown in FIG. 3. In conditions where the clutch mechanism 50 has failed, the operator may selectively remove a spacer/washer from under the head of the bolt allowing the bolt to engage both holes 75, 76 to temporarily attach the fan hub 45 and drive housing 43 together and enable the fan to cool the engine while the vehicle is driven to a obtain maintenance without overheating the engine. It will also be seen in FIG. 2, that the drive housing is comprised of two mating sections generally referenced as 43*a* and 43*b* which are connected together by a snap ring 44. The sections 43*a*, 43*b* have mating bores referenced as 48 for receiving a pin 49 for carrying the torque generated on the cover section 43*b* by the fan hub 45 when the "come home" feature is utilized. It will, of course, be appreciated that this feature is not necessary for the normal operation of the invention.

It should now be appreciated that, fundamentally, the clutch drive of this invention is a multi-plate wet (oil-lubricated) clutch 61, 63 which variably connects a cooling fan hub 45 of a vehicle to an engine driven input housing 43 in response to an electrical signal. The electrical control signal is generated, as will be described below, from engine control electronics, or otherwise. A control circuit senses the actual fan speed by means of a speed pickup 110 and thus has the capacity for rather precise feedback control over fan speed. The clutch starts in its initial and unactuated condition wherein the clutch is normally maintained in the disengaged condition with the brake engaged by spring 89. The air supply pressure is controlled by the electrically operated restricting valve 30 so that electrical control signals may operate the valve to supply pressurized air to the clutch housing. Preferably the valve output and the pressure chamber pressure varies from 0 psi to 100 psi when fully open. The resulting air pressure overcomes the spring 89 to release the brake and actuate the clutch plates 61, 63 into engagement with each other and ultimately to drive the fan hub 45 as described above. In accordance with certain objects of the invention to provide a small envelope fan clutch, the present invention permits the piston area to be relatively small, preferably less than about 13 square inches, thereby minimizing the clutch package.

The clutch mechanism is oil lubricated using the lubricating system from the engine 21. An aperture 119 in the main bracket 40 communicates with the oil inlet port 121 to receive oil from the engine 21. The engine oil flow is supplied by a conventional engine oil pump (not shown), and the oil pressure is typically dependent on engine speed. Oil which enters the clutch through oil inlet port 121 is coupled through internal bore 121*a* in the fan drive hub 45. Passage 124 is provided for lubricating bearing 51. Oil passage 125 is provided for lubricating bearings 55, 56, 91*a* and 91*b*. The flow through the center of the shaft is ported through oil passages 122 and 126 in the clutch hub 65 to the clutch pack 50 where it cools the continuously slipping clutch plates 61, 63. After the oil passes through the clutch plates 61, 63, it passes through the Pitot tube 129 and oil outlet port 130. It will be appreciated that the Pitot tube insures continuous oil flow across the clutch plates 61, 63 and permits the oil pressure within the fan clutch 20 to be relatively non-pressurized (e.g., typically less about 15 psi and preferably less than about 5 psi).

In order to dissipate about 10 horsepower in heat in slip mode by passing oil through the clutch 50, the small envelope fan clutch 20 of the present invention is capable of passing less than about 5 gallons/minute through the clutch 50. In a more preferred embodiment, the fan clutch 20 is capable of passing less than about 2.5 gallons/minute to dissipate 10 horsepower of heat. In a most preferred embodiment, the fan clutch 20 is capable of passing less than about 2.0 gallons/minute to dissipate 10 horsepower of heat.

Figure 5:
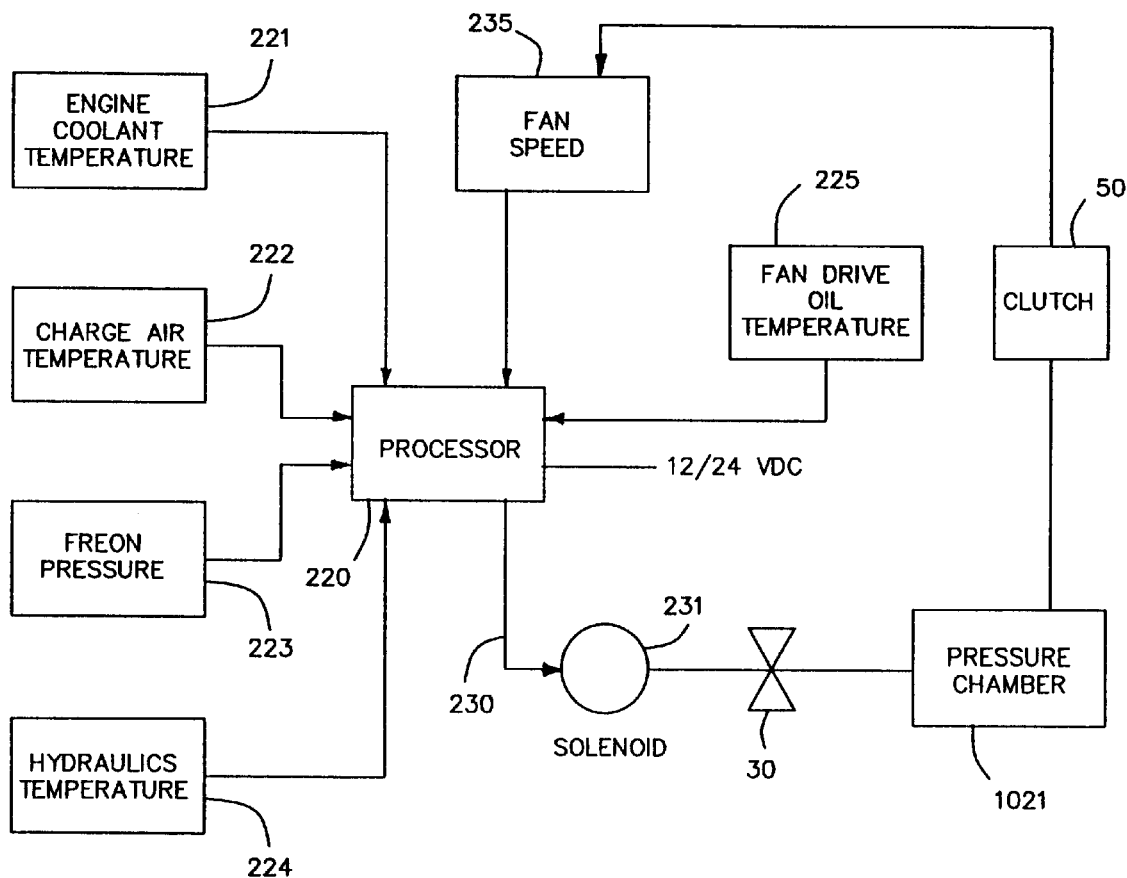
FIG. 5 is an electrical block diagram showing one form of control for the fan drive of FIG. 1.

One form of electrical circuitry of particular use with a fan clutch mechanism of the present invention is illustrated schematically in FIG. 5. The control circuitry illustrated depicts a closed loop control system for controlling the fan speed and minimizing fan speed under all engine operating conditions. Thus, the invention is capable of dynamically responding to external interferences (e.g. friction, wind, temperature, and the like) to insure that the fan speed is maintained at the desired level without drawing unnecessary power from the engine. The control circuitry is based on the use of a central processor 220 which can be a separate computer or a part of the main electronic computer which controls the engine. The processor 220 may have a plurality of inputs including, for example, an input 221 relating to engine coolant temperature, an input 222 relating to supercharged air temperature, an inlet 223 relating to the temperature and/or pressure of the freon in the air conditioning system, and a further input 224 relating to the temperature of the hydraulic fluid and/or engine oil in the system. The processor 220 is provided with a series of processing algorithms which sense these conditions and respond in whatever way is appropriate for the particular engine to produce an output signal indicative of a desired fan speed.

The clutch is electronically controlled, and thus any number of electrical or electromechanical inputs can be utilized to assemble the fan speed signal. For example, a fan drive oil temperature signal 225 illustrates a safety feature for the fan clutch system in that oil temperature can be measured, for example, at the outlet of the fan clutch drive, and if an excessive temperature is encountered indicating that the clutch is overheating, the processor 220 can respond by simply fully engaging the clutch, so there is no slippage whatsoever in the clutch mechanism until the condition is corrected.

In other examples, the engine coolant temperature can be monitored so that the fan is modulated in the temperature range between about 205° and 215° F. Above 215° F., the fan is fully engaged. With respect to charge air temperature, the fan can be modulated in the range between about 160° and 175° F. Freon temperature at the outlet of the compressor is sensed, and when the temperature is in the range of 180° to 190° F. or the pressure is in the range of 200–250 psi, fan modulation is used to cool the freon. Above 190° F., the fan drive is fully engaged. With respect to hydraulic temperature, modulation can occur in the range between about 240° and 260° F. The processor senses all of those signals, and operates the fan when any of them demand additional cooling. All ranges may be adjusted in the software for the microprocessor.

Another worthwhile benefit of the excess torque capacity of the wet clutch assembly of the present invention is the capability to operate the clutch in a continuous slip mode without damaging the clutch facing material. By monitoring engine speed, the clutch can be overdriven in order to provide increased fan speed at lower engine speeds, and can then be prevented from overspeeding the fan at higher engine speed. The latter feature prevents the drawing of unnecessary horsepower from the engine, and is accomplished by electronically clipping the fan speed to some preset maximum speed.

In one illustrative example, a fan controlling the temperature in a typical engine operating between low engine speeds (e.g., typically about 1,100 rpm) and high engine speeds (e.g., typically about 2500 rpm) may be selectively controlled using the present invention. In a typical fan which is limited to 3,000 rpm based upon optimum fatigue performance, it may be undesirable to operate the fan more than about 2,800 rpm. However, in some systems, the fan speed is proportional to the engine speed (i.e., typically may be set at about 1.4 times the engine speed) so that the fan may exceed the desirable limits at high engine speeds. In accordance with certain objects of the present invention, when the engine operates at certain predetermined higher speeds, the closed loop control system may be used to control and operate the fan in continuous slip mode and be "clipped" to a predetermined top operating fan speed to preserve engine efficiency and reduce noise.

The inputs shown in FIG. 5 are merely illustrative of the types of inputs which might be used in a practical system. Engine manufacturers are capable of sensing a number of engine operating conditions and have adequate information for producing an analog output signal which is related to a desired fan speed. The shortcoming with engines and vehicles which have been produced up until this time is the inability of the fan clutch mechanism itself to respond adequately to such a signal.

In accordance with the present invention, a fan clutch mechanism is provided which can respond, and thus the control signal of FIG. 5 becomes a practical reality. The processor thereupon outputs a signal on a line 230 which is preferably an analog signal having a continuously variable level indicative of a desired fan speed. Alternatively, the processor can output a digital signal which is converted to an analog signal, or yet a further alternative, a control mechanism can be provided which is capable of responding to a digital signal. In a particular preferred form of the invention, the processor can output a pulse width modulated pulse train, readily interpreted and compared to the speed sensor signal and producing an analog signal by a circuit at the input to the solenoid, and capable of driving the solenoid in the same fashion as a continuously variable analog signal generated by the microprocessor. In any event, and in the simplest configuration, a solenoid-operated valve system 231 is provided which responds to the signal 230 to control the valve 30, and the pressure in the pressure chamber 102 and, ultimately, the clutch mechanism 50 as has been described in detail above. The speed sensor 110 produces a fan speed input 235 which is coupled to the processor 220. The processor 220 can utilize an algorithm which matches the measured fan speed against the desired speed and adjusts the output signal 230 until the two match within a desired tolerance.

It will now be appreciated that an improved clutch drive assembly has been provided which is adapted for fitting the small envelopes typically desired in modern engines. It will be seen from inspection of FIG. 2 that the axial dimension of the assembly is very limited, less than about 8 inches and preferably about 7.3 inches, so that the clutch mechanism is readily positioned in the small axial space available between the radiator and the engine. The diameter of the housing is also compact, less than about 9.8 inches within the fan hub and less than about 6 inches at the pulley, so that a standard belt drive can be used. In order to fit within that confined package, the clutch mechanism is capable of operating under all engine operating conditions from high speed through idle and capable of generating 150 foot-pounds of torque and external control. The small envelope fan clutch mechanism 20 is also capable of operating a 55 horsepower fan at 2100 rpm. It should now be appreciated that the present invention has resulted in the ability to provide a continuously variable, fluid-actuated, externally controlled, wet clutch mechanism for an over-the-road vehicle, capable of fitting in a small envelope found in typical engine while simultaneously providing far superior functionality than has been achieved in the past.

Thus it will be seen that a novel and improved continuously variable pneumatic fan clutch has been provided which attains the aforementioned objects. Various additional modifications of the embodiments specifically illustrated and described herein will be apparent to those skilled in the art, particularly in light of the teachings of this invention. The invention should not be construed as limited to the specific form shown and described, but instead is set forth in the following claims.

What is claimed is:

1. A clutch assembly for a cooling fan in an engine, the clutch assembly being of size capable of fitting an envelope between the engine and the cooling fan associated with a cooling radiator, the clutch assembly comprising a compact housing having a belt drive input and a fan hub generating an output wherein the housing has a diameter equal to or less than about 9.8 inches and an axial length of equal to or less than about 7.3 inches so the housing may be positioned between the radiator and the engine and wherein the output is at least 150 foot-pounds of torque; and a plurality of juxtaposed driving and driven wet clutch plates in a clutch chamber in the housing, operatively connected to the compact housing and the fan hub respectively, the clutch plates having a fully engaged position in which the belt drive input and the fan hub are driven at the same speed, a disengaged position in which the belt drive input is released from the belt drive input and partially engaged positions in which the fan hub is driven at a speed between the speeds of the engaged and disengaged positions, the clutch assembly having a lubricating fluid passageway therein for communicating lubricating fluid to the clutch chamber, the belt drive input including a sheave offset axially from the clutch plates with the inner diameter of the sheave being less than the outer diameter of the wet clutch plates.

2. The clutch assembly of claim 1 wherein the driving clutch plates are splined along an inner surface of the housing at the outermost radial periphery of the clutch chamber.

3. The clutch assembly of claim 2 wherein the housing includes a radially extending inner surface defining an operating face engaging the wet clutch plates in the engaged and partially engaged positions.

4. The clutch assembly of claim 3 wherein the housing includes a cover section interfit telescopically with the belt drive input, and further comprising a snap ring joining the belt drive input and the cover section without any threaded fasteners, the cover section defining said operating face.

5. The clutch assembly of claim 1 further comprising a fluid actuated piston, a clutch hub and a spring mechanism, the fluid actuated piston and the spring mechanism providing opposing forces on the clutch hub, the clutch hub carrying a pressure plate controlling the position of the clutch plates in proportion to the fluid pressure applied to the fluid actuated piston, the clutch hub having a splined connection to the driven clutch plates and a splined connection to an output shaft which drives the fan hub to thereby connect the driven clutch plates to the fan hub, the fluid activated piston and spring mechanism being disposed radially inward of the pressure plate such that the piston operates inside of the clutch plates but provides axial forces on the clutch plates.

6. The clutch assembly of claim 5 wherein the spring mechanism is compressed between the housing and the clutch hub.

7. The clutch assembly of claim 6 further comprising a pneumatic piston in the housing driven by an externally controlled pressurized air source to continuously vary the position of the clutch plates.

8. The clutch assembly of claim 1 wherein the clutch plates have sufficient total surface area and the lubricating fluid passageway is sufficiently large enough to feed enough lubricating fluid over the surfaces of the clutch plates such that the clutch assembly is capable of dissipating 10 horsepower in heat.

9. A clutch assembly for a cooling fan in an engine, the clutch assembly being of size capable of fitting an envelope between the engine and the cooling fan associated with a cooling radiator, the clutch assembly comprising a compact housing having a belt drive input and a fan hub generating an output wherein the housing has a diameter equal to or less than about 9.8 inches and an axial length of equal to or less than about 7.3 inches so the housing may be positioned between the radiator and the engine and wherein the output is at least 55 horsepower at 2100 rpm; and a plurality of juxtaposed driving and driven wet clutch plates in a clutch chamber in the housing, operatively connected to the compact housing and the fan hub respectively, the clutch plates having a fully engaged position in which the belt drive input and the fan hub are driven at the same speed, a disengaged position in which the belt drive input is released from the belt drive input and partially engaged positions in which the fan hub is driven at a speed between the speeds of the engaged and disengaged positions, the clutch assembly having a lubricating fluid passageway therein for communicating lubricating fluid to the clutch chamber, the housing including a cover section interfit telescopically with the belt drive input, the belt drive input and the cover section being joined by a snap ring without any threaded fasteners.

10. The clutch assembly of claim 9 wherein the belt drive input includes a sheave offset axially from the clutch plates with the inner diameter of the sheave being less than the outer diameter of the wet clutch plates.

11. The clutch assembly of claim 10 wherein the driving clutch plates are splined along an inner surface of the belt drive input at the outermost radial periphery of the clutch chamber.

12. The clutch assembly of claim 11 wherein the cover section defines an operating face engaging the wet clutch plates in the engaged and partially engaged positions.

13. The clutch assembly of claim 9 further comprising a fluid actuated piston, a clutch hub and a spring mechanism, the fluid actuated piston and the spring mechanism being disposed radially inboard of the wet clutch plates and providing opposing forces on the clutch hub, the clutch hub carrying a pressure plate controlling the position of the clutch plates in proportion to the fluid pressure applied to the fluid actuated piston, the clutch hub having a splined connection to the driven clutch plates and a splined connection to an output shaft which drives the fan hub to thereby connect the driven clutch plates to the fan hub, the fluid activated piston and spring mechanism being disposed radially inward of the pressure plate such that the piston operates inside of the clutch plates but provides axial forces on the clutch plates.

14. The clutch assembly of claim 13 wherein the spring mechanism is compressed between the housing and the clutch hub.

15. The clutch assembly of claim 9 further comprising a pneumatic piston in the housing driven by an externally controlled pressurized air source to continuously vary the position of the clutch plates.

16. The clutch assembly of claim 9 wherein the clutch plates have sufficient total surface area and the lubricating fluid passageway is sufficiently large enough to feed enough lubricating fluid over the surfaces of the clutch plates such that the clutch assembly is capable of dissipating 10 horsepower in heat.

17. The clutch assembly of claim 9 wherein the housing includes a radially extending inner surface defining an operating face engaging the wet clutch plates in the engaged and continuously variable positions.

18. A clutch assembly for a cooling fan in an engine, the clutch assembly being of size capable of fitting an envelope between the engine and the cooling fan associated with a cooling radiator, the clutch assembly comprising a compact housing having a belt drive input and a fan drive hub generating an output wherein the housing has a diameter equal to or less than about 9.8 inches and an axial length of equal to or less than about 7.3 inches so the housing may be positioned between the radiator and the engine and a plurality of juxtaposed driving and driven wet clutch plates in a clutch chamber in the housing, operatively connected to the compact housing and the fan hub respectively, the clutch plates having a fully engaged position in which the input and hub are rotated at the same speed, a declutched position in which the drive hub is stationary, and continuously variable positions therebetween in which the drive hub is rotated at continuously variable speeds; the clutch assembly having a lubricating fluid passageway therein for communicating lubricating fluid to the clutch chamber wherein the clutch plates have sufficient surface area and receive sufficient flow of lubricating fluid such that the clutch assembly is capable of dissipating 10 horsepower in heat while in the continuously variable positions; and wherein the driving clutch plates are splined along an inner annular surface of the housing at the radial periphery of the clutch chamber to thereby maximize clutch plate area for the given diameter of the housing.

19. The assembly of claim 18 wherein the clutch plates have a total surface area of at least 130 square inches.

20. The clutch assembly of claim 18 wherein the belt drive input includes a sheave offset axially from the clutch plates with the inner diameter of the sheave being less than the outer diameter of the wet clutch plates.

21. The clutch assembly of claim 18 wherein the housing includes a cover section interfit telescopically with the belt drive input, and further comprising a snap ring joining the belt drive input and the cover section without any threaded fasteners, the cover section defining said operating face.

22. The clutch assembly of claim 21 wherein the spring mechanism is compressed between the housing and the clutch hub.

23. The clutch assembly of claims 18 further comprising a fluid actuated piston, a clutch hub and a spring mechanism, the fluid actuated piston and the spring mechanism being disposed radially inboard of the wet clutch plates and providing opposing forces on the clutch hub, the clutch hub carrying a pressure plate controlling the position of the clutch plates in proportion to the fluid pressure applied to the fluid actuated piston, the clutch hub having a splined connection to the driven clutch plates and a splined connection to an output shafting which drives the fan hub to thereby connect the driven clutch plates to the fan hub, the fluid activated piston and spring mechanism being disposed radially inward of the pressure plate such that the piston operates inside of the clutch plates but provides axial forces on the clutch plates.

24. The clutch assembly of claim 18 further comprising a pneumatic piston in the housing driven by an externlly controlled pressurized air source to continuously vary the position of the clutch plates.

25. A clutch assembly for a cooling fan in an engine, the clutch assembly being of size capable of fitting an envelope between the engine and the cooling fan associated with a cooling radiator, the clutch assembly comprising a compact housing having a belt drive input and a fan drive hub generating an output wherein the housing has a diameter equal to or less than about 9.8 inches and an axial length of equal to or less than about 7.3 inches so the housing may be positioned between the radiator and the engine; a plurality of juxtaposed driving and driven wet clutch plates in a clutch chamber in the housing, operatively connected to the compact housing and the fan hub respectively, the clutch plates having a fully engaged position in which the input and hub are rotated at the same speed, a declutched position in which the drive hub is stationary, and continuously variable positions therebetween in which the drive hub is rotated at continuously variable speeds; the clutch plates having a total surface area of at least 130 square inches, the clutch assembly having a lubricating fluid passageway therein for communicating lubricating fluid to the clutch chamber, the belt drive input including a sheave offset axially from the clutch plates with the inner diameter of the sheave being less than the outer diameter of the wet clutch plates.

26. The assembly of claim 25 wherein the clutch assembly is capable of dissipating 10 horsepower in heat while in the continuously variable positions.

27. The clutch assembly of claim 25 wherein the driving clutch plates are splined along an inner surface of the housing at the outermost radial periphery of the clutch chamber.

28. The clutch assembly of claim 25 wherein the housing includes a radially extending inner surface defining an operating face engaging the wet clutch plates in the engaged and partially engaged positions.

29. The clutch assembly of claim 27 wherein the housing includes a cover section interfit telescopically with the belt drive input, and further comprising a snap ring joining the belt drive input and the cover section without any threaded fasteners, the cover section defining said operating face.

30. The clutch assembly of claim 25 further comprising a fluid actuated piston, a clutch hub and a spring mechanism, the fluid actuated piston and the spring mechanism being disposed radially inboard of the wet clutch plates and providing opposing forces on the clutch hub, the clutch hub carrying a pressure plate controlling the position of the clutch plates in proportion to the fluid pressure applied to the fluid actuated piston, the clutch hub having a splined connection to the driven clutch plates and a splined connection to an output shafting which drives the fan hub to thereby connect the driven clutch plates to the fan hub, the fluid activated piston and spring mechanism being disposed radially inward of the pressure plate such that the piston operates inside of the clutch plates but provides axial forces on the clutch plates.

31. The clutch assembly of claim 25 further comprising a pneumatic piston driven by an externally controlled pressurized air source to continuously vary the position of the clutch plates.

32. The clutch assembly of claim 30 wherein the spring mechanism is compressed between the housing and the clutch hub.

* * * * *